(12) United States Patent
Reddy

(10) Patent No.: US 6,419,016 B1
(45) Date of Patent: Jul. 16, 2002

(54) METHODS OF CEMENTING IN SUBTERRANEAN ZONES

(75) Inventor: B. Raghava Reddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 38 days.

(21) Appl. No.: 09/675,644

(22) Filed: Sep. 29, 2000

(51) Int. Cl.⁷ .............................................. E21B 33/138
(52) U.S. Cl. ...................... 166/293; 106/677; 106/678; 106/727; 106/808; 106/823; 166/309; 507/244; 507/905; 524/2
(58) Field of Search ................................ 166/293, 309; 106/677, 678, 725, 727, 808, 809, 820, 823; 507/243, 244, 905; 524/2

(56) References Cited

U.S. PATENT DOCUMENTS

| | | | | |
|---|---|---|---|---|
| 3,116,264 A | * | 12/1963 | Wahl ........................... | 166/293 |
| 3,140,269 A | * | 7/1964 | Wahl ........................... | 166/293 |
| 3,511,314 A | * | 5/1970 | Scott, Jr. et al. ............ | 106/719 |
| 3,762,873 A | * | 10/1973 | Oude Alink ............. | 507/243 X |
| 3,943,083 A | * | 3/1976 | Adams et al. .............. | 166/293 |
| 4,650,522 A | * | 3/1987 | Teraji et al. ................ | 106/727 |
| 5,213,161 A | | 5/1993 | King et al. ................. | 166/293 |
| 5,220,960 A | | 6/1993 | Totten et al. ............... | 166/293 |
| 5,281,270 A | | 1/1994 | Totten et al. ............... | 106/687 |
| 5,298,069 A | | 3/1994 | King et al. ................. | 106/686 |
| 5,368,642 A | * | 11/1994 | Rodrigues et al. .......... | 106/724 |
| 5,417,759 A | * | 5/1995 | Huddleston ............ | 106/123.11 |
| 5,421,879 A | * | 6/1995 | Rodrigues ................... | 106/727 |
| 5,536,311 A | * | 7/1996 | Rodrigues ................... | 106/724 |
| 5,672,203 A | * | 9/1997 | Chatterji et al. ............ | 106/727 |
| 5,688,844 A | | 11/1997 | Chatterji et al. ............... | 524/8 |
| 5,795,924 A | | 8/1998 | Chatterji et al. ........... | 523/130 |
| 5,806,594 A | | 9/1998 | Stiles et al. ................. | 166/293 |
| 5,820,670 A | | 10/1998 | Chatterji et al. ............ | 106/727 |
| 5,871,577 A | * | 2/1999 | Chatterji et al. ............ | 106/727 |
| 5,900,053 A | | 5/1999 | Brothers et al. ............ | 106/678 |
| 5,908,885 A | | 6/1999 | Sikes et al. ..................... | 524/5 |
| 6,019,835 A | | 2/2000 | Chatterji et al. ............ | 106/725 |
| 6,054,553 A | | 4/2000 | Groth et al. ................ | 528/335 |
| 6,063,738 A | | 5/2000 | Chatterji et al. ............ | 507/269 |
| 6,136,950 A | * | 10/2000 | Vickers et al. ............. | 106/608 |
| 6,227,294 B1 | * | 5/2001 | Chatterji et al. ............ | 106/677 |
| 6,273,191 B1 | * | 8/2001 | Reddy et al. ............... | 106/724 |
| 6,290,770 B1 | * | 9/2001 | Moreau et al. ............. | 106/708 |
| 6,310,143 B1 | * | 10/2001 | Vicker, Jr. et al. ...... | 106/823 X |

FOREIGN PATENT DOCUMENTS

JP              408169741         *  7/1996

* cited by examiner

*Primary Examiner*—George Suchfield
(74) *Attorney, Agent, or Firm*—Craig W. Roddy; C. Clark Dougherty, Jr.

(57) ABSTRACT

Improved methods of cementing in subterranean zones penetrated by well bores are provided. The methods are basically comprised of the steps of preparing a cement composition comprised of a hydraulic cement, a biodegradable, substantially non-dispersing set retarder of low anionic character comprised of polysuccinimide and sufficient water to form a slurry, placing said cement composition in said subterranean zone and allowing said cement composition to set into a solid mass therein.

22 Claims, No Drawings

METHODS OF CEMENTING IN SUBTERRANEAN ZONES

BACKGROUND OF THE INVENTION

1. Field of the Invention

The present invention relates to improved methods of cementing in subterranean zones with set retarded foamed and non-foamed cement compositions.

2. Description of the Prior Art

Hydraulic cement compositions are often utilized in cementing subterranean zones penetrated by well bores. For example, such cement compositions are used in primary well cementing operations whereby strings of pipe such as casing and liners are cemented in well bores. In performing primary cementing, a cement composition is pumped into the annular space between the walls of a well bore and the exterior surfaces of a pipe string disposed therein. The cement composition is permitted to set in the annular space thereby forming an annular sheath of hardened substantially impermeable cement therein. The cement sheath physically supports and positions the pipe string in the well bore and bonds the exterior surfaces of the pipe string to the walls of the well bore whereby the undesirable migration of fluids between zones or formations penetrated by the well bore is prevented.

The hydraulic cement compositions utilized for cementing in subterranean zones penetrated by well bores can have densities ranging from high densities, e.g., 28 pounds per gallon to low densities, e.g., 7 pounds per gallon depending upon the fracture gradients of the formations penetrated by the well bores in which the cement compositions are to be placed. In some wells penetrating easily fractured zones or formations, lightweight cement compositions are required to prevent excessive hydrostatic pressure from unintentionally fracturing the zones or formations. In such applications, foamed cement compositions are often utilized having densities in the range of from about 7 to about 13 pounds per gallon. In other applications where the unintentional fracturing of subterranean zones or formations penetrated by the well bores is not a concern, non-foamed cement compositions are utilized having densities in the range of from about 14 to about 28 pounds per gallon.

When foamed or non-foamed cement compositions are utilized for cementing in deep hot subterranean zones, a set retarder must be included in the cement compositions to increase the pumping time of the compositions and prevent premature thickening or setting before placement in the zones to be cemented. Examples of set retarders which have been utilized in non-foamed cement compositions include, but not limited to, lignosulfonates, sulfomethylated lignosulfonates, hydroxycarboxy acids, borates, gluconates, mixtures of sulfomethylated lignosulfonates and hydroxycarboxy acids, carboxymethylcelluloses, acrylic acid/2-acrylamido-2-methyl propane sulfonic acid copolymers and the like. These and other similar set retarders are generally anionic. As a result of being anionic, the set retarders function as dispersing agents in hydraulic cement compositions. When large quantities of such retarders are used to retard the compositions at high temperatures, the cement compositions become so thin that severe settling becomes a major concern. As a result, additional chemical additives have to be added to prevent settling.

The dispersing action of anionic set retarders poses a different problem when used in foamed hydraulic cement compositions. Because of the dispersing action of the set retarders, the foamed cement slurry is thinned which causes the foam to break or significantly decrease in viscosity which in turn prevents the desired low density of the foamed cement composition from being achieved. In order to overcome this problem, it has heretofore been necessary to utilize large excesses of foaming and foam stabilizing surfactants in set retarded foamed cement slurries.

Thus, there are needs for improved methods of cementing in subterranean zones penetrated by well bores using cement compositions which include biodegradable, substantially non-dispersing set retarders.

SUMMARY OF THE INVENTION

The present invention provides improved methods of cementing in subterranean zones penetrated by well bores utilizing foamed or non-foamed cement compositions containing a biodegradable, substantially non-dispersing set retarder comprised of polysuccinimide which meet the needs described above and overcome the deficiencies of the prior art. That is, because of its low anionic character, the polysuccinimide set retarder does not significantly disperse the cement compositions and under the alkaline conditions of the cement compositions, breaks down into completely biodegradable components. The improved methods of this invention utilizing a non-foamed cement composition are basically comprised of the following steps. A cement composition is prepared comprised of hydraulic cement, a biodegradable, substantially non-dispersing set retarder of low anionic character comprised of polysuccinimide and sufficient water to form a slurry. The cement composition is then placed into a subterranean zone and allowed to set into a solid mass therein.

The methods of the present invention utilizing a foamed cement composition are the same as described above for non-foamed cement compositions except that the prepared cement composition is comprised of a hydraulic cement, a biodegradable, substantially non-dispersing set retarder of low anionic character comprised of polysuccinimide, sufficient water to form a slurry, a mixture of foaming and foam stabilizing surfactants present in an amount sufficient to foam and stabilize a foamed cement composition and sufficient gas to form a foam.

It is, therefore, a general object of the present invention to provide improved methods of cementing in subterranean zones penetrated by well bores.

A further object of the present invention is the provision of improved methods of cementing in subterranean zones penetrated by well bores utilizing a foamed or non-foamed cement composition containing a biodegradable, substantially non-dispersing set retarder.

Other and further objects, features and advantages of the present invention will be readily apparent to those skilled in the art upon a reading of the description of preferred embodiments which follows.

DESCRIPTION OF PREFERRED EMBODIMENTS

The improved methods and cement compositions of the present invention are particularly suitable for performing a variety of completion and remedial procedures in subterranean zones or formations penetrated by well bores. The cement compositions have improved properties in that they include a biodegradable, substantially non-dispersing set retarder of low anionic character which is effective over a broad temperature range and does not cause thinning of non-foamed cement slurries or decreases in the viscosities of foamed cement compositions whereby their densities increase. Since it is often very important that the density of a foamed cement composition be as low as possible, an increase in density can cause adverse cementing results and fracturing of the formation or zone being cemented.

The non-foamed cement compositions useful in accordance with this invention are basically comprised of a hydraulic cement; a biodegradable, substantially non-dispersing set retarder of low anionic character comprised of polysuccinimide; and sufficient water to form a slurry.

The foamed cement compositions useful in accordance with this invention are basically comprised of a hydraulic cement; a biodegradable, substantially non-dispersing set retarder of low anionic character comprised of polysuccinimide; sufficient water to form a slurry; a mixture of foaming and foam stabilizing surfactants present in an amount sufficient to foam and stabilize a foamed cement composition; and sufficient gas to form a foam.

A variety of hydraulic cements can be utilized in accordance with the present invention including those comprised of calcium, aluminum, silicon, oxygen and/or sulfur which set and harden by reaction with water. Such hydraulic cements include Portland cements, pozzolana cements, gypsum cements, high alumina content cements, silica cements and high alkalinity cements. Portland cements or their equivalents are generally preferred for use in accordance with the present invention when performing cementing operations in subterranean zones penetrated by well bores. Portland cements of the types defined and described in *API Specification For Materials And Testing For Well Cements*, API Specification 10, 5$^{th}$ Edition, dated Jul. 1, 1990 of the American Petroleum Institute are particularly suitable. Preferred API Portland cements include classes A, B, C, G and H. Of these, classes A, G and H are most often utilized for cementing in subterranean zones.

The biodegradable, substantially non-dispersing set retarder utilized in accordance with this invention is essentially a nonionic succinimide polymer having a molecular weight in the range of from about 5,000 to about 100,000. Polysuccinimide forms completely biodegradable polyaspartic acids and aspartic acid salts in alkaline mediums and can be utilized at well temperatures ranging from about 70° F. to about 350° F. Polysuccinimide is commercially produced by the thermal polymerization of a mixture of maleic anhydride and ammonia or aspartic or glutamic acid with or without acid catalysts and related precursor monomeric reactants that upon heating produce polyaspartic acid which then condenses to yield the polyimide. Molecular weights and the degree of branching can be varied depending upon the reaction conditions. The ionic character of the polymer is dependent upon the number of carboxylic acid chain ends. By adjusting the molecular weight, the ionic nature of the polymer can be controlled. These and other processes for producing polysuccinimide are well known to those skilled in the art.

As will be understood, the amount of the biodegradable, substantially non-dispersing polysuccinimide set retarder included in the cement compositions useful in accordance with this invention can vary depending upon the temperature of the zone to be cemented and the particular pumping time required. Generally, the polysuccinimide set retarder is included in foamed and non-foamed cement compositions in an amount in the range of from about 0.1% to about 3% by weight of hydraulic cement in the composition.

The water utilized to form the cement compositions of this invention can be fresh water or salt water. The term "salt water" is used herein to mean unsaturated salt solutions and saturated salt solutions including brines and seawater. The water is included in the cement compositions in an amount sufficient to form a slurry of the hydraulic cement and other solid materials in the composition. Generally, the water is present in the cement compositions in an amount in the range of from about 35% to about 65% by weight of hydraulic cement therein.

When a foamed cement composition is utilized, a mixture of foaming and foamed stabilizing surfactants present in an amount sufficient to form and stabilize a foamed cement composition is included in the cement composition. A particularly preferred mixture of foaming and foam stabilizing surfactants for use in accordance with the present invention is comprised of an ethoxylated alcohol ether sulfate of the formula $H(CH_2)_a(OC_2H_4)_bOSO_3NH_4^+$ wherein a is an integer in the range of from about 6 to about 10 and b is an integer in the range of from about 3 to about 10, an alkyl or alkene amidopropylbetaine having the formula $R-CONHCH_2CH_2CH_2N^+(CH_3)_2CH_2CO_2^-$ wherein R is a radical selected from the group of decyl, cocoyl, lauryl, cetyl and oleyl and an alkyl or alkene amidopropyldimethylamine oxide having the formula $R-CONHCH_2CH_2CH_2N^+(CH_3)_2O^-$ wherein R is a radical selected from the group of decyl, cocoyl, lauryl, cetyl and oleyl.

The ethoxylated alcohol ether sulfate is generally present in the above described mixture in an amount in the range of from about 60 to 64 parts by weight. The alkyl or alkene amidopropylbetaine is generally present in the mixture in an amount in the range of from about 30 to about 33 parts by weight and the alkyl or alkene amidopropyldimethylamine oxide is generally present in the additive in an amount in the range of from about 3 to about 10 parts by weight. In order to make the surfactant mixture more easily combinable with the cement slurry, water can be combined with the mixture in an amount sufficient to dissolve the surfactants.

The most preferred foaming and foam stabilizing surfactant mixture of the type described above for use in accordance with this invention is comprised of an ethoxylated alcohol ether sulfate wherein a in the formula set forth above is an integer in the range of from 6 to 10 and the ethoxylated alcohol ether sulfate is present in the surfactant mixture in an amount of about 63.3 parts by weight; the alkyl or alkene amidopropylbetaine is cocoylamidopropylbetaine and is present in the mixture in an amount of about 31.7 parts by weight and the alkyl or alkene amidopropyldimethylamine oxide is cocoylamidopropyldimethylamine oxide and is present in an amount of about 5 parts by weight.

The mixture of foaming and foam stabilizing surfactants is generally included in the foamed cement composition as a 30% to 50% aqueous solution in an amount in the range of from about 0.5% to about 5% by volume of water in the cement slurry, preferably in an amount of from about 1% to about 3%.

The gas utilized for foaming the cement slurry can be air or nitrogen, with nitrogen being preferred. The gas is present in an amount sufficient to foam the slurry, generally in an amount in the range of from about 10% to about 35% by volume of the slurry.

A particularly preferred foamed cement composition for use in accordance with this invention is comprised of Portland cement; a biodegradable, substantially non-dispersing set retarder of low anionic character comprised of polysuccinimide present in an amount in the range of from about 0.1% to about 3% by weight of cement in the composition; sufficient water to form a slurry; a mixture of foaming and foam stabilizing surfactants comprised of an ethoxylated alcohol ether sulfate present in the mixture in an amount of about 63.3 parts by weight; cocoylamidopropylbetaine present in the mixture in an amount of about 31.7 parts by weight and cocoylamidopropyldimethylamine oxide present in the mixture in an amount of about 5 parts by weight; the mixture being present in the cement composition as a 30% to 50% aqueous solution in an amount in the range of from about 1% to about 3% by volume of water in the cement composition; and sufficient gas to form a foam.

The water used is preferably included in the above described foamed cement composition in an amount in the range of from about 35% to about 55% by weight of hydraulic cement therein and the gas, preferably nitrogen, is preferably present in the composition in an amount in the range of from about 15% to about 30% by volume of the composition.

A preferred method of the present invention for cementing in a subterranean zone penetrated by a well bore is comprised of: (a) preparing a cement composition comprised of a hydraulic cement, a biodegradable, substantially non-dispersing set retarder of low anionic character comprised of a polysuccinimide and sufficient water to form a slurry; (b) placing the cement composition into the subterranean zone; and (c) allowing the cement composition to set into a solid mass therein. The hydraulic cement is preferably Portland cement, most preferably, API Class A, G or H Portland cement. The polysuccinimide set retarder preferably has a molecular weight in the range of from about 5,000 to about 100,000 and is present in the cement composition in an amount in the range of from about 0.1% to about 3% by weight of hydraulic cement therein. The water is preferably selected from the group consisting of fresh water and salt water and is preferably present in an amount in the range of from about 35% to about 55% by weight of cement.

Another preferred method of the present invention for cementing in a subterranean zone penetrated by a well bore is comprised of: (a) preparing a foamed cement composition comprised of a hydraulic cement, a biodegradable, substantially non-dispersing set retarder of low anionic character comprised of polysuccinimide, sufficient water to form a slurry, a mixture of foaming and foam stabilizing surfactants present in an amount sufficient to form and stabilize a foamed cement composition and sufficient gas to form a foam; (b) placing the cement composition in the subterranean zone; and (c) allowing the cement composition to set into a solid mass therein.

The hydraulic cement in the foamed cement composition is preferably Portland cement and most preferably API Class A, G or H Portland cement. The biodegradable, substantially non-dispersing set retarder comprised of polysuccinimide preferably has a molecular weight in the range of from about 5,000 to about 100,000 and is present in an amount in the range of from about 0.1% to about 3% by weight of hydraulic cement in the composition. The water is preferably fresh water or salt water present in an amount in the range of from about 35% to about 55% by weight of hydraulic cement in the composition. The mixture of foaming and foamed stabilizing surfactants is preferably comprised of an ethoxylated alcohol ether sulfate present in the mixture in an amount of about 63.3 parts by weight, cocoylamidopropylbetaine present in the mixture in an amount of about 31.7 parts by weight and cocoylamidopropyldimethylamine oxide present in the mixture in an amount of about 5 parts by weight. The mixture of surfactants is preferably present in the composition as a 30% to 50% aqueous solution in an amount in the range of from about 1% to about 3%. The gas in the foamed composition is preferably nitrogen present in an amount in the range of from about 15% to about 30%.

In order to further illustrate the methods and cement compositions of this invention, the following examples are given.

EXAMPLE 1

Various test cement slurries were prepared in a Waring blender by the addition of a cement mixture containing an API Class Portland cement and a polysuccinimide set retarder to mix water with stirring. The slurries were tested for thickening time in accordance with the API thickening time testing procedure set forth in the American Petroleum Institute, API Specification 10, Fifth Edition, Jul. 1, 1990. The components and their quantities in the test cement slurries and the results of the tests are presented in Table I below.

TABLE

Thickening Time Data For Cement Slurries Including Polysuccinimide

| Test No. | Cement Class | Silica Flour, % by wt. of cement | Water, % by wt. of cement | Polysuccinimide, % by wt. of cement | Temp., ° F. | Thickening time, hr:min |
|---|---|---|---|---|---|---|
| 1 | A | — | 42 | None | 100 | 3:10 |
| 2 | A | — | 42 | 0.5 | 100 | 10:20 |
| 3 | A | — | 42 | None | 140 | 1:50 |
| 4 | A | — | 42 | 0.5 | 140 | 3:20 |
| 5 | A | — | 42 | 0.7 | 140 | 6:50 |
| 6 | A | — | 46 | None | 180 | 1:00 |
| 7 | A | — | 46 | 0.5 | 180 | 7:15 |
| 8 | H | 35% | 54 | None | 240 | 1:00 |
| 9 | M | 35% | 54 | 0.5 | 240 | 7:00 |
| 10 | H | 35% | 54 | 1.0 | 240 | 15:00 |
| 11 | H | 35% | 54 | 0.5 | 270 | 2:00 |

EXAMPLE 2

The base cement slurry used in Test No. 4 was prepared as described in Example 1. The base slurry was mixed with foaming and foam stabilizing surfactants in an amount equal to 1% by volume of the water present in the slurry and then subjected to high shear until entrained air reduced the slurry density to 12 pounds per gallon. The stability of the foamed slurry was tested by filling a plastic cup with the slurry and allowing it to set at room temperature. Any reduction in the initial volume of the slurry would be indicative of unstable foam due to the loss of the gas phase. No foam loss was observed. The compressive strength of the foamed composition was obtained by curing the foamed slurry at 140° F. under water for 24 hours and testing the sample for its compressive strength according to API procedure. The compressive strength of the cured foamed slurry was 440 psi.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. An improved method of cementing in a subterranean zone penetrated by a well bore comprising the steps of:
   (a) preparing a cement composition comprised of a hydraulic cement, a biodegradable, substantially non-dispersing set retarder of low anionic character comprised of polysuccinimide and sufficient water to form a slurry;

(b) placing said cement composition into said subterranean zone; and (c) allowing said cement composition to set into a solid mass therein.

2. The method of claim 1 wherein said polysuccinimide has a molecular weight in the range of from about 5,000 to about 100,000.

3. The method of claim 1 wherein said polysuccinimide is present in an amount in the range of from about 0.1% to about 3% by weight of hydraulic cement in said composition.

4. The method of claim 1 wherein said hydraulic cement is Portland cement.

5. The method of claim 1 wherein said water is selected from the group consisting of fresh water and salt water.

6. The method of claim 1 wherein said water is present in an amount in the range of from about 35% to about 55% by weight of hydraulic cement in said composition.

7. The method of claim 1 wherein said cement composition further comprises a mixture of foaming and foam stabilizing surfactants present in an amount sufficient to form and stabilize a foamed cement composition.

8. The method of claim 7 wherein said mixture of foaming and foam stabilizing surfactants is comprised of an ethoxylated alcohol ether sulfate present in an amount of about 63.3 parts by weight, cocoylamidopropylbetaine present in an amount of about 31.7 parts by weight and cocoylamidopropyldimethylamine oxide present in an amount of about 5 parts by weight.

9. The method of claim 8 wherein said mixture of foaming and foam stabilizing surfactants in a 30% to 50% aqueous solution is present in an amount in the range of from about 1% to about 3% by volume of water therein.

10. The method of claim 7 wherein said cement composition further comprises sufficient gas to form a foam.

11. The method of claim 10 wherein said gas is selected from the group consisting of air and nitrogen.

12. The method of claim 11 wherein said gas is present in said composition in an amount in the range of from about 15% to about 30% by volume of said composition.

13. An improved method of cementing in a subterranean zone penetrated by a well bore comprising the steps of:

(a) preparing a cement composition comprised of a hydraulic cement, a biodegradable, substantially non-dispersing set retarder of low anionic character comprised of polysuccinimide, sufficient water to form a slurry, a mixture of foaming and foam stabilizing surfactants present in an amount sufficient to form and stabilize a foamed cement composition and sufficient gas to form a foam;

(b) placing said cement composition into said subterranean zone; and (c) allowing said cement composition to set into a solid mass therein.

14. The method of claim 13 wherein said polysuccinimide has a molecular weight in the range of from about 5,000 to about 100,000.

15. The method of claim 13 wherein said polysuccinimide is present in an amount in the range of from about 0.1% to about 3% by weight of hydraulic cement in said composition.

16. The method of claim 13 wherein said hydraulic cement is Portland cement.

17. The method of claim 13 wherein said water is selected from the group consisting of fresh water and salt water.

18. The method of claim 13 wherein said water is present in an amount in the range of from about 35% to about 55% by weight of hydraulic cement in said composition.

19. The method of claim 13 wherein said mixture of foaming and foam stabilizing surfactants is comprised of an ethoxylated alcohol ether sulfate present in an amount of about 63.3 parts by weight, cocoylamidopropylbetaine present in an amount of about 31.7 parts by weight and cocoylamidopropyldimethylamine oxide present in an amount of about 5 parts by weight.

20. The method of claim 13 wherein said mixture of foaming and foam stabilizing surfactants in a 30% to 50% aqueous solution is present in an amount in the range of from about 1% to about 3% by volume of water therein.

21. The method of claim 13 wherein said gas is selected from the group consisting of air and nitrogen.

22. The method of claim 13 wherein said gas is present in said composition in an amount in the range of from about 15% to about 30% by volume of said composition.

* * * * *